United States Patent
Karasawa

(10) Patent No.: US 9,512,946 B2
(45) Date of Patent: Dec. 6, 2016

(54) JOINT

(71) Applicant: Ihara Science Corporation, Tokyo (JP)

(72) Inventor: Susumu Karasawa, Tokyo (JP)

(73) Assignee: IHARA SCIENCE CORPORATION, Tokyo (JP)

( * ) Notice: Subject to any disclaimer, the term of this patent is extended or adjusted under 35 U.S.C. 154(b) by 0 days.

(21) Appl. No.: 13/889,098

(22) Filed: May 7, 2013

(65) Prior Publication Data

US 2013/0299726 A1 Nov. 14, 2013

(30) Foreign Application Priority Data

May 8, 2012 (JP) .............................. 2012-002682U

(51) Int. Cl.

| F16L 19/02 | (2006.01) |
|---|---|
| F16K 7/16 | (2006.01) |
| F16K 27/00 | (2006.01) |
| F16L 29/00 | (2006.01) |

(52) U.S. Cl.
CPC ............... *F16L 29/007* (2013.01); *F16K 7/16* (2013.01); *F16K 27/003* (2013.01); *F16L 19/0218* (2013.01)

(58) Field of Classification Search
CPC ............ F16K 41/12; F16K 7/16; F16K 7/126; F16K 27/003; F16L 19/0218; F16L 29/007
USPC .............................. 251/331, 335.2, 273, 274
See application file for complete search history.

(56) References Cited

U.S. PATENT DOCUMENTS

| 1,410,205 A | * | 3/1922 | Madigan .................... 251/331 |
| 1,662,291 A | * | 3/1928 | Bastian ..................... 251/274 |
| 1,801,186 A | * | 4/1931 | Arenz ....................... 411/394 |
| 1,974,639 A | * | 9/1934 | Bates ......................... 165/96 |
| 2,186,833 A | * | 1/1940 | Iler .......................... 251/268 |
| 2,388,989 A | * | 11/1945 | Mueser ..................... 251/265 |
| 2,654,559 A | * | 10/1953 | Franck ..................... 251/331 |
| 4,867,201 A | * | 9/1989 | Carten .................. 137/625.18 |
| 5,881,997 A | * | 3/1999 | Ogawa et al. ............ 251/335.2 |
| 6,923,198 B2 | * | 8/2005 | McKenzie et al. ........ 137/15.18 |
| 2001/0032958 A1 | * | 10/2001 | Artsvelyan ............ F16K 7/126 251/331 |
| 2006/0289824 A1 | * | 12/2006 | Wincek .................... 251/331 |
| 2006/0289825 A1 | * | 12/2006 | Wincek .................... 251/331 |

FOREIGN PATENT DOCUMENTS

| JP | 07-019673 | 1/1995 |
| JP | 09-014470 | 1/1997 |
| JP | 2000-179744 | 6/2000 |
| JP | 2007-147011 | 6/2007 |

OTHER PUBLICATIONS

English language translation of JP 07-019673 published Apr. 7, 1995.

(Continued)

*Primary Examiner* — Michael R Reid
(74) *Attorney, Agent, or Firm* — DLA Piper LLP (US)

(57) ABSTRACT

A joint that connects pipelines, a pipeline with a fluid control device, or a pair of fluid control devices is provided therein with a pipe functional component. Examples of the pipe functional component include various valves such as a diaphragm valve, a check valve, a branch valve, a relief valve, a ball valve and a bellows valve, or a filter.

1 Claim, 10 Drawing Sheets

(56) References Cited

OTHER PUBLICATIONS

English language abstract of JP 09-014470 published Jan. 14, 1997.
English language translation of JP 09-014470 published Jan. 14, 1997.
English language abstract of JP 07-019673 published Jan. 20, 1995.
English language translation of JP 07-019673 published Jan. 20, 1995.
English language abstract of JP 2000-179744 published Jun. 27, 2000.
English language translation of JP 2000-179744 published Jun. 27, 2000.
English language abstract of JP 2007-147011 published Jun. 14, 2007.
English language translation of JP 2007-147011 published Jun. 14, 2007.

* cited by examiner

JOINT

The entire disclosure of Japanese Utility Model Application No. 2012-002682 filed May 8, 2012 is expressly incorporated by reference herein.

BACKGROUND OF THE INVENTION

1. Field of the Invention The present invention relates to a joint. For instance, the present invention relates to a joint provided therein with a pipe functional component such as a diaphragm valve.

2. Description of Related Art

Diaphragm valves are often used in semiconductor manufacture apparatuses for controlling a supply of various gases.

The diaphragm valves include a valve unit for opening/closing a flow channel, a drive unit for driving the valve unit and a diaphragm interposed between the valve unit and the drive unit to insulate the valve unit from the drive unit. The diaphragm keeps the fluid flowing in the flow channel from entering the drive unit and simultaneously keeps metal particles and the like of the drive unit from being mixed in the fluid.

For instance, Literature 1 (JP-A-9-14470) and Literature 2 (JP-U-7-19673) disclose diaphragm valves that include: a valve body; an inflow channel and an outflow channel provided to the valve body; a valve seat provided between the inflow channel and the outflow channel; a diaphragm that is into and out of contact with the valve seat to open/close a gap between the inflow channel and the outflow channel; a valve shaft screwed to a side of the valve body opposite to the valve seat with the diaphragm being interposed, the valve shaft being axially moved to bring the diaphragm into/out of contact with the valve seat; and a handle integrated with the valve shaft.

Further, Literature 3 (JP-A-2000-179744) discloses a bellows valve (not a diaphragm valve) of which a valve shaft (spindle) is provided with a triple thread screw. In the bellows valve, turning of a handle provided to the valve shaft causes a movement of a square tube screwed to the valve shaft by the triple thread screw, so that the bellows valve is opened/closed by a valve element integrated with the square tube. With the use of the triple thread screw, the bellows valve is capable of causing a larger movement of the valve element per a rotation of the handle, thereby enabling open/close operation with a small operation amount. Such a multiple thread screw is effectively employed for enhancing operability in bellows valves that have considerably larger stroke of the valve element than that of diaphragm valves.

However, the diaphragm valves disclosed in Literatures 1 and 2 include a block-shaped valve case (respectively shown as reference sign 1) and is supported by a component different from a pipeline via an appropriate support member attached to the valve case. Since the support member is screwed to the valve case, the valve case has to be sufficiently thick for providing a threaded hole. Thus, the size and weight of such a valve case are increased, which hampers size and weight reduction of the diaphragm valve.

In addition, the diaphragm valves disclosed in Literatures 1 and 2 require a long valve shaft and a large number of components including a housing with which the valve shaft is screwed, a cylindrical nut to be screwed with the housing, the valve case with which a cylindrical nut is screwed and a lock nut for keeping the cylindrical nut from being loosened, which also hampers the size and weight reduction of the diaphragm valve.

Further, a pipeline connected to a diaphragm valve for relatively small flow amount of reaction gas (e.g. a diaphragm valve used for a semiconductor manufacture apparatus) has not so large a pipe diameter and has small rigidity. Thus, though a screw portion is provided to each of right and left joint portions of the diaphragm valves disclosed in Literatures 1 and 2, sufficient support strength cannot be obtained even when the diaphragm valves are to be supported between ends of pipelines by connectors screwed to the screw portions. Accordingly, as described above, it is necessary to provide a large valve case to the diaphragm valves to support the diaphragm valves via support members screwed to the valve case. The provision of the support member results in a complicated support structure.

The above applies not only to diaphragm valves but also to pipe functional components in general including various valves such as a small-flow-amount check valve, a branch valve, a relief valve, a ball valve and a bellows valve, and a filter.

In other words, these pipe functional components not only include a large-size valve case and a number of components that hamper size and weight reduction, but also are supported at a part different from a pipeline via a complicated support structure. Accordingly, in order to independently provide the pipe functional components at predetermined sections, the pipe functional components that are relatively larger than the pipeline are noticeably present in a pipe system, resulting in a complicated impression of the pipe system.

Incidentally, though the bellows valve disclosed in Literature 3 can reduce the operation amount of the handle and exhibits excellent operability, the size of the valve shaft and the square tube cannot be reduced.

The bellows valve is generally used for a larger amount of fluid as compared to a diaphragm valve and has flanges on both ends of a joint portion thereof. In order to accept a large amount of fluid, the diameter of the pipeline and, consequently, rigidity thereof are increased. Thus, when the flange of the bellows valve is fixed to a flange of the pipeline to support the entirety of the bellow valve, a sufficient support strength can be ensured.

In other words, the pipe functional components for a large flow amount are typically not adapted for reducing the size and weight, and even when the pipe functional components are disposed in a pipe system, such pipe functional components are buried in the large complicated pipelines, which does not provide so much complicated impression.

SUMMARY OF THE INVENTION

An object of the invention is, without relying on the idea for independently providing pipe functional components to predetermined components in a pipe system, to provide a joint that is capable of exhibiting a function of the pipe functional component only with the use of the joint for joining the pipelines and the like of the pipe system and is capable of simplifying the appearance of the pipe system for relatively small amount of fluid.

A joint according to an aspect of the invention connects pipelines, a pipeline with a fluid control device, or a pair of fluid control devices, the joint including: a pipe functional component provided inside the joint.

Examples of the pipe functional component include various valves such as a diaphragm valve, a check valve, a branch valve, a relief valve, a ball valve and a bellows valve, or a filter.

According to the above aspect of the invention, since the joint is provided therein with the pipe functional component, instead of independently providing the pipe functional components in a pipe system as in a conventional arrangement, it is only required to dispose a joint that is frequently used in the pipe system in order to achieve a desired fluid control and the like by the function of the pipe functional component provided within the joint. Accordingly, since there is no eminent pipe functional component in the pipe system, the complicated impression can be eliminated and the appearance can be simplified.

In the joint according to the above aspect of the invention, it is preferable that the pipe functional component is a diaphragm valve that includes: a body; an inflow channel and an outflow channel provided in the body; a valve seat provided between the inflow channel and the outflow channel; a diaphragm that is configured to be into and out of contact with the valve seat to open and close a gap between the inflow channel and the outflow channel; and a valve shaft that is screwed to a side of the body opposite to the valve seat with the diaphragm being interposed therebetween, the valve shaft being axially moved to bring the diaphragm into and out of contact with the valve seat.

According to the above arrangement, since the stroke of the valve shaft of the diaphragm valve (pipe functional component) for open/close operation may be small due to the structure thereof, the size of the pipe functional component can be reduced, so that the joint can be constructed without highlighting the presence of the pipe functional component.

In the joint according to the above aspect of the invention, it is preferable that a pair of connecting portions are provided on an outer circumference of the body at positions each corresponding to an end of the inflow channel and an end of the outflow channel, the connecting portions being configured to be connected with the pipeline or the fluid control device via a connector, and the valve seat and a lower surface of a part of the body corresponding to a section between the pair of the connecting portions are provided so as not to protrude beyond outer circumferences of the connecting portions.

According to the above arrangement, since the lower surface of the body is defined at the position not to protrude outward beyond the outer circumferences of the connecting portions, a large block-shaped valve case that is present in the conventional diaphragm valve can be provided in a form of a thin body. Further, since the valve seat is provided at a position not to protrude beyond the outer circumferences of the connecting portions, the valve seat can be located close to a flow channel in the body, so that the size of the body can be further reduced. With the above features, the size and weight reduction of the entire joint can be further enhanced and the joint can be directly supported on the pipeline and the like.

Accordingly, it is not necessary to use a support member for supporting the joint on the other component of the pipe system, so that a complicated support structure is not required and the appearance of the pipe system can be simplified. In addition, since the support member is not required, the production cost can be reduced.

In the joint according to the above aspect of the invention, it is preferable that an external thread provided on a cylindrical raised lid portion is screwed to an internal thread provided on the body, an external thread provided on the valve shaft is screwed with an internal thread provided on the raised lid portion, and a mating section of the body and the raised lid portion and the mating section of the raised lid portion and the valve shaft are coaxially provided and are radially overlapped with each other.

The term "radially overlapped with each other" herein refers to the presence of a part of each of the mating sections that is provided at the same axial position.

According to the above arrangement, the raised lid portion corresponds to a housing of a conventional diaphragm valve. However, in the above arrangement, since the raised lid portion is directly screwed with an inside of the body, the conventional cylindrical nut, and, further, a lock nut for keeping the cylindrical nut and the housing from being loosened can be omitted. In addition, since the mating section of the body and the raised lid portion and the mating section of the raised lid portion and the valve shaft are radially overlapped, the end of the valve shaft can be screwed with the raised lid portion at a position close to the body, and, consequently, to the diaphragm.

Thus, since the cylindrical nut and the lock nut are unnecessary and the end of the valve shaft can be brought close to the diaphragm, the length of the valve shaft can be extremely shortened, so that the size of the diaphragm valve can be significantly reduced. Further, since the components that are conventionally requisite are not necessary, the production cost can be further reduced.

In the joint according to the above aspect of the invention, it is preferable that the internal thread provided on the raised lid portion and the external thread provided on the valve shaft are provided by multiple thread screws mating with each other.

According to the above arrangement, since the internal thread provided on the raised lid portion and the external thread provided on the valve shaft of the diaphragm valve are provided by the multiple thread screws, even when the turning angle of the valve shaft is small, a large displacement of the valve shaft can be ensured for bringing the diaphragm into and out of contact with the valve seat.

Thus, the time required for opening and closing the flow channel can be reduced, thereby allowing a rapid open/close operation. In addition, since the turning angle of the valve shaft may be small, the turning operation of the valve shaft can be facilitated.

In the joint according to the above aspect of the invention, it is preferable that the internal thread provided on the raised lid portion and the external thread provided on the valve shaft are each a double thread screw, and a lead of the double thread screw is defined to be approximately four times as large as a clearance between the valve seat and the diaphragm when the diaphragm valve is fully opened.

In a typical arrangement, when an operator closes the flow channel, the operator recognizes the closing of the flow channel according to a touch of the operator when the handle cannot be further turned after turning the handle. Thus, the tightening force varies according to each operator, so that the valve seat and the valve shaft are likely to be damaged.

In contrast, according to the above arrangement, since the internal thread of the raised lid portion and the external thread of the valve shaft are each provided by a double thread screw and the lead of the double thread screw is defined to be approximately four times as large as the clearance between the valve seat and the diaphragm when the diaphragm valve is fully opened, when the valve shaft is turned approximately ninety degrees, the valve shaft is moved by a distance equal to the clearance between the valve seat and the diaphragm.

Thus, the diaphragm can be brought into and out of contact with the valve seat for opening and closing the flow channel only by turning the valve shaft by ninety degrees, so that the turning operation of the valve shaft can be extremely easily conducted. In addition, by attaching an arrow on the end face of the valve shaft, the open/close condition of the valve can be visually recognized according to the direction of the arrow, so that the damage of the valve seat and the valve shaft can be reduced.

In the joint according to the above aspect of the invention, it is preferable that a head of the valve shaft is provided in a form of a shaft portion of a polygonal cross section or a shaft portion of a spline or a serration, and a handle is engageably and disengageably provided to the shaft portion.

According to the above arrangement, since the head of the valve shaft is provided in a form of a shaft portion of a polygonal cross section or a shaft portion of a spline or a serration, the handle can be made engageable with and disengageable from the head of the valve shaft only by forming the engagement hole of the handle in a shape corresponding to the head of the valve shaft. Accordingly, by attaching the handle as necessary, the valve shaft can be manually turned without employing a tool and the like.

In the joint according to the above aspect of the invention, it is preferable that a bracket for fixing the body to a support plate is detachably provided to the body.

According to the above arrangement, since the bracket for fixing the body to the support plate is detachably provided to the body, by fixing the body to the support plate via the bracket as necessary, the vibration and the like of the body caused in accordance with circulation of fluid can be restrained.

DESCRIPTION OF EMBODIMENT(S)

First Exemplary Embodiment

A joint 1 according to a first exemplary embodiment of the invention will be described below with reference to attached drawings.

Structure of Joint

Figure 1:
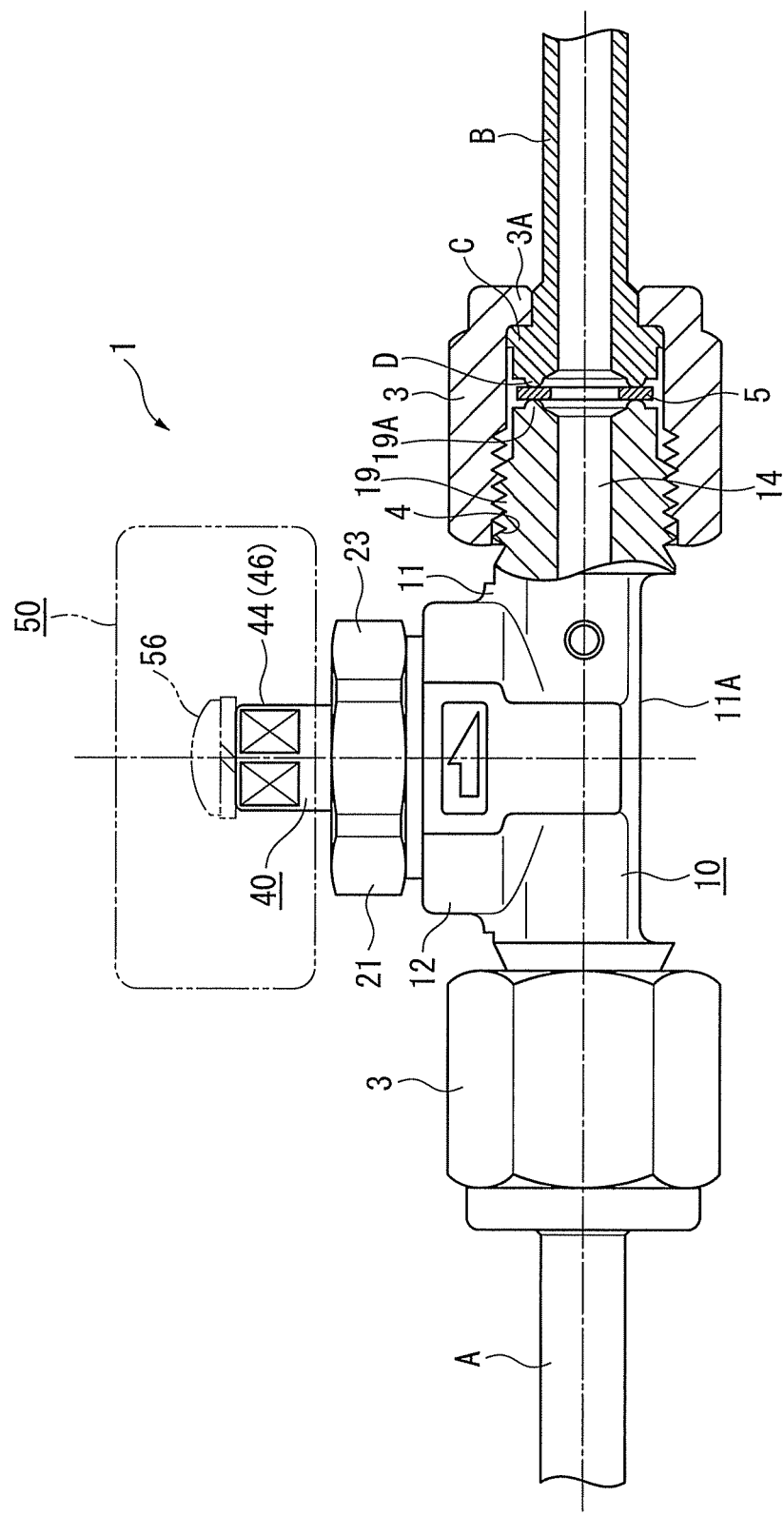
FIG. 1 is a partially sectioned front elevational view showing a joint according to a first exemplary embodiment of the invention.
Figure 2:
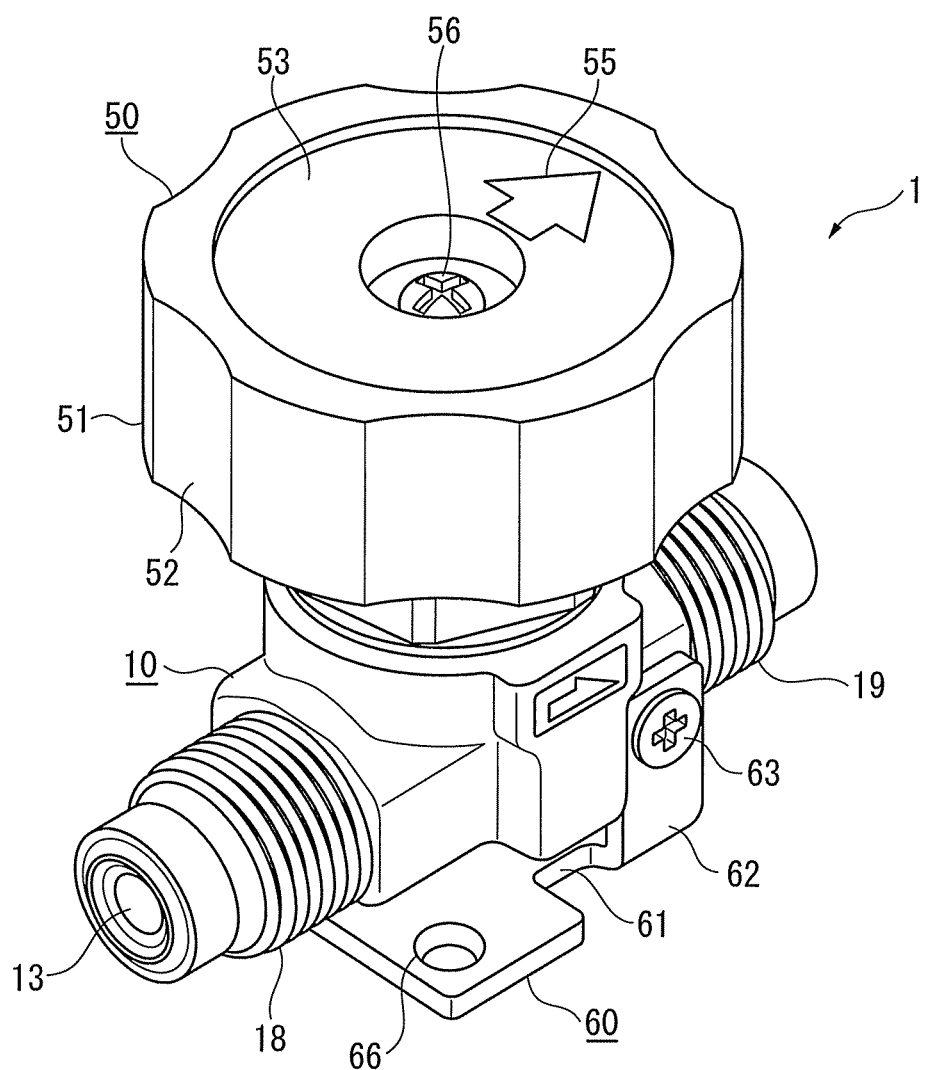
FIG. 2 is a perspective view showing the first exemplary embodiment.
Figure 3:
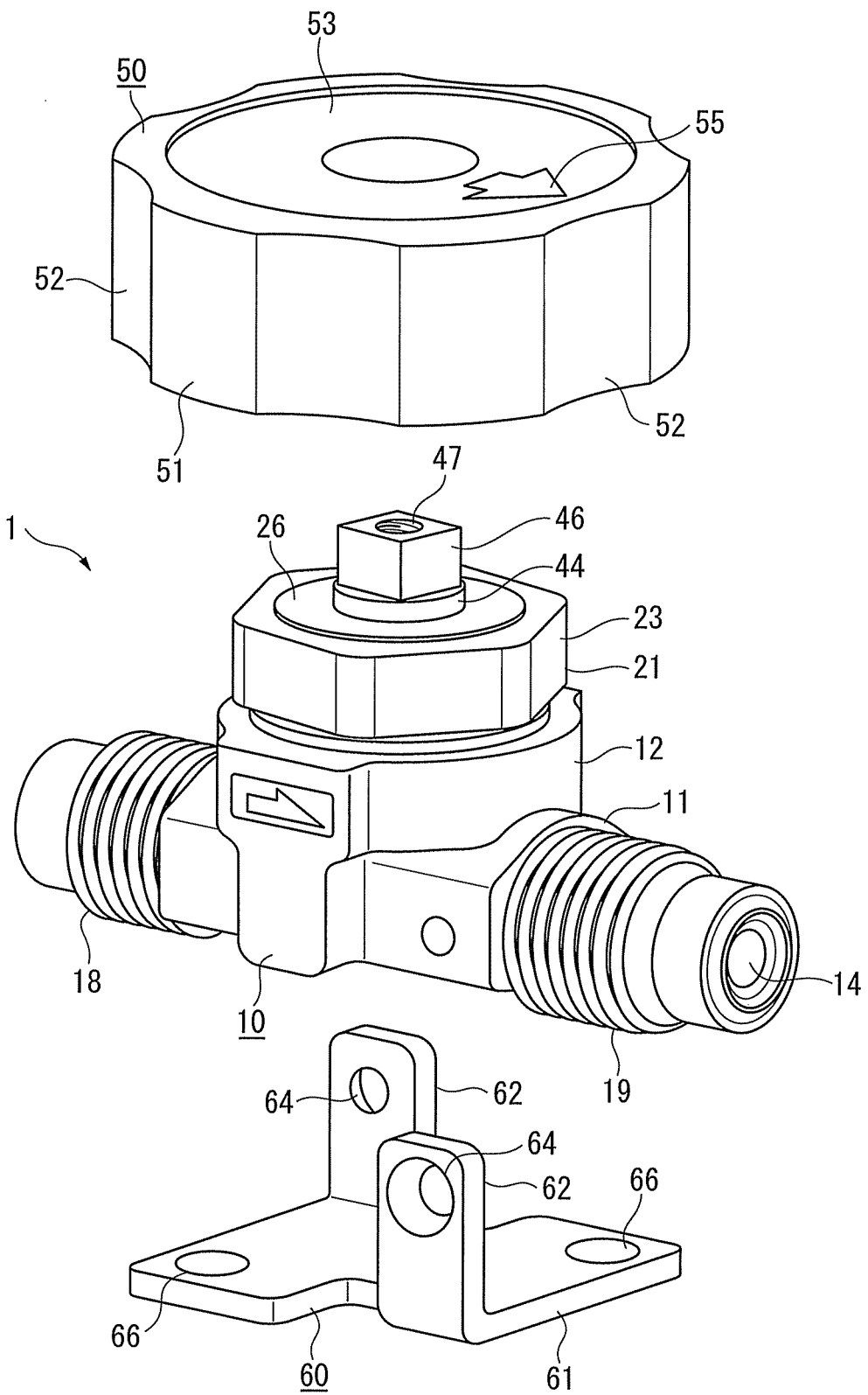
FIG. 3 is an exploded perspective view showing the first exemplary embodiment.
Figure 4:
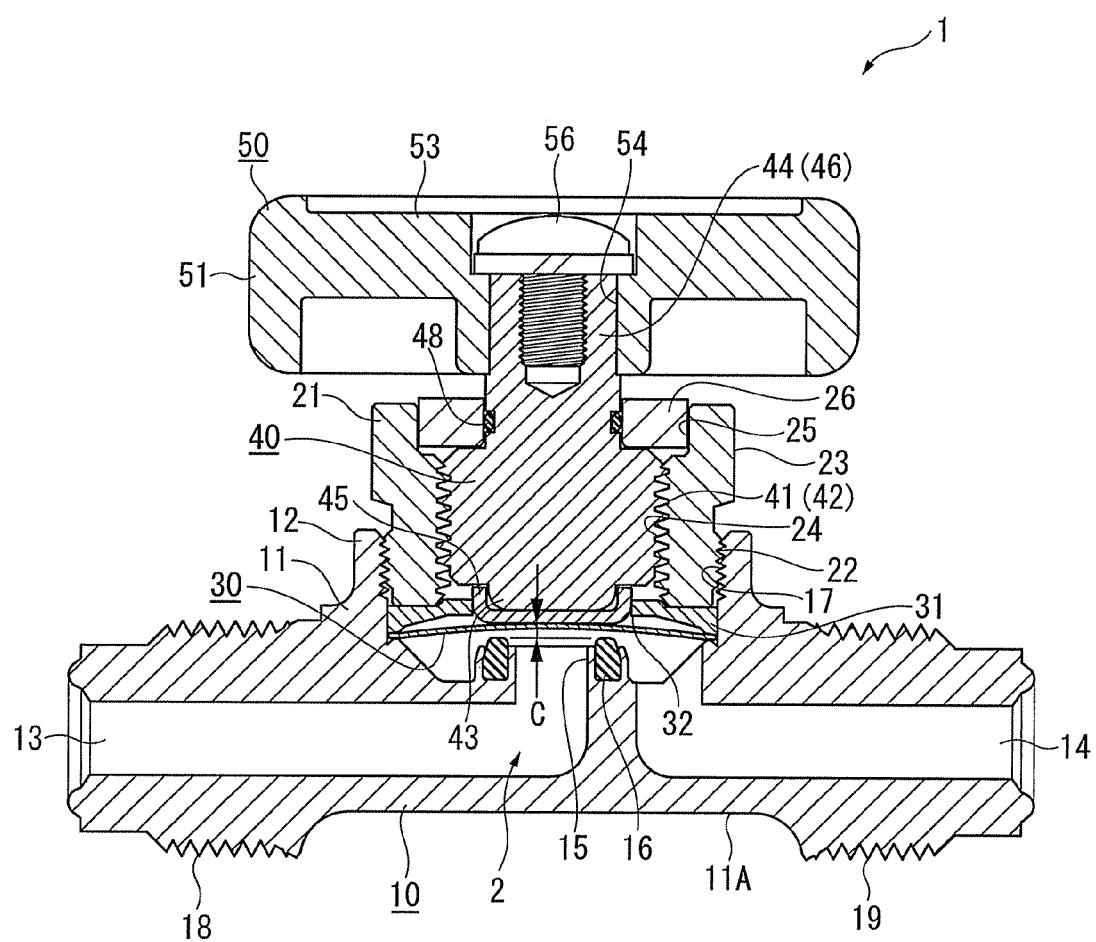
FIG. 4 is a cross sectional view showing the first exemplary embodiment.

FIG. 1 is a partially sectioned front elevational view showing the joint 1 according to the first exemplary embodiment. FIG. 2 is a perspective view of the joint 1. FIG. 3 is an exploded perspective view of the joint 1. FIG. 4 is a cross sectional view of the joint 1.

As shown in FIG. 1, the joint 1 is a component for joining pipelines (a first connection pipe A and a second connection pipe B) that are disposed in right and left directions in the figure. Though not exhaustive, the first and second connection pipes A and B in the first exemplary embodiment are used as pipes of a pipe system for supplying reactive gas to a semiconductor manufacture apparatus. Since the flow amount of the reactive gas is not so large, the diameter and rigidity of the first and second connection pipes A and B are small. Thus, sufficient reduction in size and weight of the joint 1 disposed between the first and second connection pipes A and B is also achieved in accordance with the specification of the first and second connection pipes A and B.

The joint 1 is connected to each of the first and second connection pipes A and B via a cap nut 3 (connector). On the second connection pipe B as a representative, the cap nut 3 is provided with a small-diameter engagement portion 3A. A large-diameter gland C to be engaged with the engagement portion 3A of the cap nut 3 is provided at an end of the second connection pipe B. When the cap nut 3 engaged with the gland C is rotated, an internal thread 4 provided to the cap nut 3 is screwed with an external thread 19 provided to both ends of the joint 1, whereby the joint 1 and the second connection pipe B are mutually connected.

In this configuration, annular projections 19A and 19D of a chevron cross section are provided to each of the opposing surfaces of the joint 1 and the second connection pipe B. An annular metal gasket 5 is interposed between the projections 19A and 19D. When the cap nut 3 is tightened, the projections 19A and 19D press both sides of the gasket 5 to provide a sealing function.

As shown in FIGS. 2 to 4, the joint 1 is provided therein with a pipe functional component in a form of a diaphragm valve 2 (FIG. 4). The joint 1 includes: a joint body 10 (body); an inflow channel 13 and an outflow channel 14 formed in the joint body 10; a valve seat 15 provided between the inflow channel 13 and the outflow channel 14; a diaphragm 30 provided to the joint body 10 in a manner capable of displacement, the diaphragm 30 being in and out of contact with the valve seat 15 to open/close a gap between the inflow channel 13 and the outflow channel 14; a valve shaft 40 screwed to the joint body 10 at a side opposite to the valve seat 15 with the diaphragm 30 being interposed therebetween, the valve shaft 40 bringing the diaphragm 30 into and out of contact with the valve seat 15 in accordance with axial displacement thereof; a handle 50 detachably engaged with the valve shaft 40; and a bracket 60 for fixing the joint body 10 to a support plate (not shown).

The joint body 10 includes a joint body unit 11 in a form of a tube of a predetermined length. A cylindrical rise portion 12 that rises outward is provided midway between ends of the joint body 10.

The inflow channel 13 and the outflow channel 14 are formed inside the joint body unit 11 along a central axis, the inflow channel 13 extending from a first end of the joint body unit 11 toward the rise portion 12 and the outflow channel 14 extending from the rise portion 12 toward a second end of the joint body unit 11. The valve seat 15 (raised portion at an end of the inflow channel 13) is provided at the center of the rise portion 12. A resin-made seal ring 16 is buried at an upper end face of the valve seat 15 with a part thereof being protruded. An internal thread 17 is provided on an inner wall surface of the rise portion 12. A raised lid portion 21 is screwed with the internal thread 17.

An external thread 22 to be screwed into the internal thread 17 of the joint body unit 11 and a hexagonal portion 23 are provided on the outer circumference of the raised lid portion 21. An internal thread 24 and a hole 25 that has a larger inner diameter than that of the internal thread 24 are provided inside the raised lid portion 21. A ring-shaped retaining member 26 for preventing a detachment of the valve shaft 40 is press-fitted to the hole 25.

Incidentally, an external thread 18 (connecting portion) is provided on an outer circumference of the first end of the joint body unit 11 corresponding to an end of the inflow channel 13. An external thread 19 (connecting portion) is provided on an outer circumference of the second end of the joint body unit 11 corresponding to an end of the outflow channel 14. A cap nut 3 for connecting the first connection pipe A (FIG. 1) to the joint body 10 is screwed to the external thread 18. A cap nut 3 for connecting the second connection pipe B (FIG. 1) to the joint body 10 is screwed to the external thread 19. The external threads 18 and 19 may be provided by a tapered screw, parallel screw or a combination thereof.

A lower surface 11A of the joint body unit 11 (joint body 10) at a part corresponding to a section between the external threads 18 and 19 is flat and recessed relative to a lower part of the external threads 18 and 19 on both sides thereof. In other words, the lower surface 11A is provided at a position not to protrude outward beyond the outer circumferences of the external threads 18 and 19. Thus, the joint body 10 provided with the joint body unit 11 does not form a large block-shaped valve case as in the conventional arrangement. In addition, the valve seat 15 of the first exemplary embodiment is also provided at a position not to protrude outward beyond the outer circumference of the external threads 18 and 19 inside the joint body 10.

The diaphragm 30 is a thin disc member of a metal (e.g. stainless steel). The diaphragm 30 is disposed so that the center of the diaphragm 30 is located right above the valve seat 15. The circumference of the valve seat 15 is fixed to an inner bottom portion of the rise portion 12. In other words, the circumference of the diaphragm 30 is fixed between the inner bottom portion of the rise portion 12 and the raised lid portion 21 through a diaphragm retainer 31, so that the central portion of the diaphragm 30 is capable of displacement toward and away from the valve seat 15. An opening 32 is formed at the center of the diaphragm retainer 31.

The valve shaft 40 includes a screw portion 42 having an external thread 41 to be screwed into the internal thread 24 formed inside the raised lid portion 21, a distal press portion 43 provided at an end of the screw portion 42, and a shaft portion 44 that is thinner than an outer diameter of the screw portion 42.

The internal thread 24 formed on the raised lid portion 21 and the external thread 41 formed on the valve shaft 40 are provided by multiple thread screws. In the first exemplary embodiment, the internal thread 24 and the external thread 41 are provided by double thread screws. The lead of the double thread screws is defined to be approximately four times as large as a clearance C between the valve seat 15 (more specifically, an upper end of the seal ring 16) and the diaphragm 30 when the diaphragm valve 2 is fully opened. Thus, when the valve shaft 40 is turned ninety degrees, the diaphragm 30 is in and out of contact with the valve seat 15.

Further, the mating section of the internal thread 24 of the raised lid portion 21 and the external thread 41 of the valve shaft 40 and the mating section of the internal thread 17 of the rise portion 12 and the external thread 22 of the raised lid portion 21 are coaxially provided and are radially overlapped with each other. Specifically, both of the external thread 22 and the internal thread 24 of the raised lid portion 21 are provided from the lower end of the raised lid portion 21, and the valve shaft 40 and the raised lid portion 21 are screwed immediately inside the mating section of the rise portion 12 and the raised lid portion 21. Thus, the valve shaft 40 is screwed with the raised lid portion 21 at a position near the joint body 10, thus reducing the length of the valve shaft 40.

A pressing member 45 of a U-shaped cross section that is protruded from the opening 32 is fitted to the distal press portion 43.

A head 46 having an outer circumference of a rectangular cross section is provided to the shaft portion 44. An internal thread 47 is formed at the center of the head 46. A seal ring 48 for closing a gap against an inner circumference of the retaining member 26 is provided on an outer circumference of the shaft portion 44 between the head 46 and the screw portion 42. The seal ring 48 serves as a dust seal for preventing an invasion of foreign substances. Further, the seal ring 48 generates a frictional force against the shaft portion 44 to provide a favorable operation touch with a predetermined resistance force while operating the handle 50.

The handle 50 is a cylindrical (cap-shaped) member having a circumferential wall 51 and an upper side wall 53.

Dents 52 that serve as grips when being held by a hand are provided on the circumferential wall 51 at predetermined angular intervals. An engagement hole 54 of a rectangular cross section to be engaged with the head 46 of the shaft portion 44 is formed at the center of the upper side wall 53. An arrow 55 indicating a flow direction of the fluid is inscribed at a periphery of the upper side wall 55. The handle 50 is fixed by a setscrew 56 screwed with the internal thread 47 while the engagement hole 54 is engaged with the head 46 of the shaft portion 44. The arrow 55 is directed from the inflow channel 13 to the outflow channel 14 when the valve is open (state shown in FIG. 4). A surface of the arrow 55 is colored in a fluorescent color so as to be visually recognizable during nighttime.

It should be noted that the handle 50 is an optional component as necessary and is not requisite for the joint 1. In other words, though it is possible that the handle 50 is constantly attached to the joint 1, since it is sufficient for the handle 50 to be used for opening/closing the diaphragm valve 2 provided therein, the handle 50 may be kept detached from the joint 1 when the diaphragm valve 2 is kept closed/opened.

The bracket 60 is a member produced by bending a single plate material. The bracket 60 includes a substantially rectangular attachment plate 61 and attachment pieces 62 provided by parallelly bending corner pieces diagonally located on opposing sides of the attachment plate 61 in a direction perpendicular to the attachment plate 61.

Bolt insertion holes 64 for fixing the bracket 60 to the joint body 10 with a bolt 63 are provided at an end of each of the attachment pieces 62. Bolt insertion holes 66 for fixing the bracket 60 to the support plate (not shown) with a bolt are provided at diagonal positions of the attachment plate 61.

The bracket 60 is also not requisite for the joint 1. The bracket 60 is used for supporting the joint 1 on the other component. Since the joint 1 of which size and weight are reduced according to the first exemplary embodiment can be inherently sufficiently supported by connecting both ends of the joint 1 to the first and second connection pipes A and B, the bracket 60 can be omitted except for a special instance requiring, for instance, vibration suppression.

Incidentally, though not provided to the joint 1 according to the first exemplary embodiment, irrespective of whether the handle 50 is constantly attached or is attached only in open/close operation, a handle lock mechanism for locking the open/close condition of the diaphragm valve 2 may be provided. Handle lock mechanisms disclosed in Literatures 1 and 2 and the like are usable as the handle lock mechanism. Specifically, though not illustrated and described in detail, the handle and a housing may be engaged and locked through a pin and a notch and the like into which the pin is inserted at close and open positions of the handle in accordance with opening/closing of the diaphragm and the handle and housing may be disengaged by, for instance, turning the handle while pressing the handle to unlock the handle.

Operation of Internal Diaphragm Valve

When fluid is flowed from the first connection pipe A (FIG. 1) while the diaphragm valve 2 is opened (state shown in FIG. 4), the fluid flows toward the second connection pipe B (FIG. 1) through the inflow channel 13, the valve seat 15 and the outflow channel 14.

Figure 5:
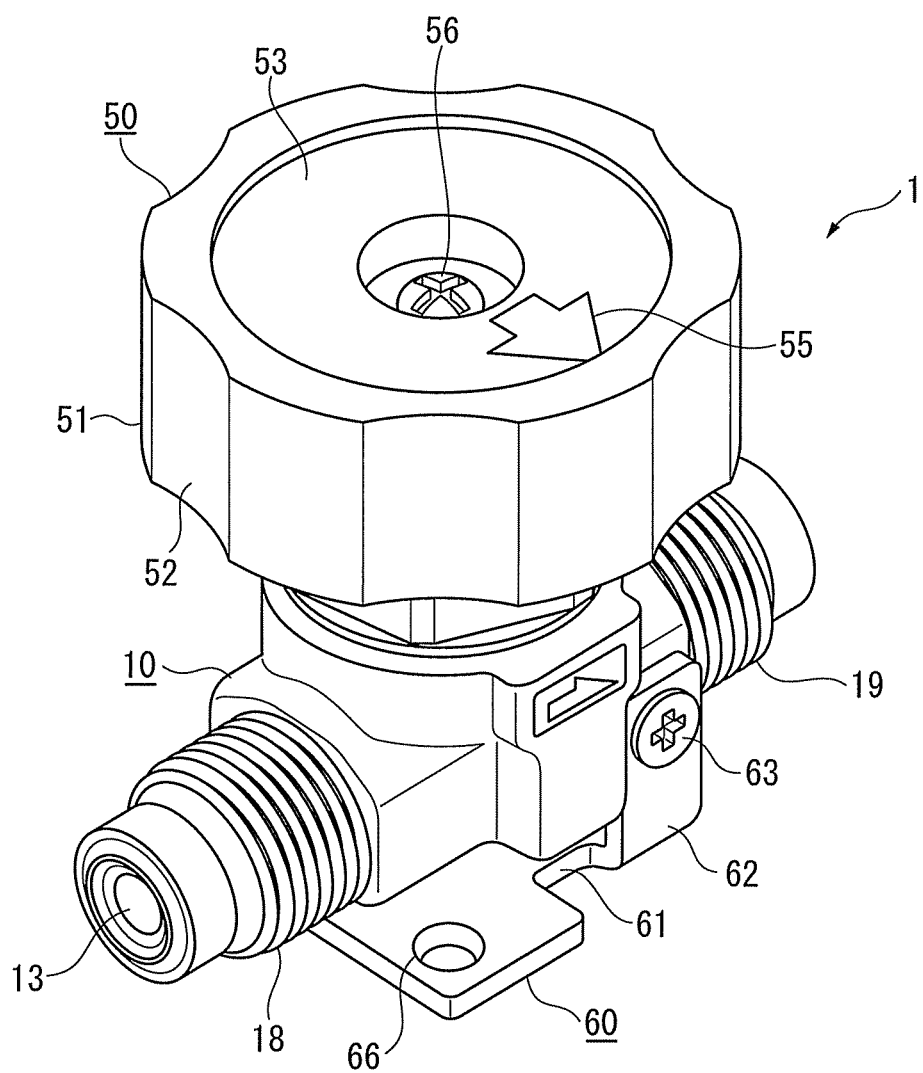
FIG. 5 is a perspective view showing the joint according to the first exemplary embodiment in which a handle is turned by ninety degrees.

In this state, the handle 50 is turned ninety degrees. Specifically, as shown in FIG. 5, the handle 50 is turned until the arrow 55 inscribed on the upper side wall 53 of the handle 50 becomes orthogonal to the joint body 10.

At this time, since the leads of the external thread 41 of the valve shaft 40 and the internal thread 24 of the raised lid portion 21 are defined to be approximately four times as large as the clearance C between the valve seat 15 and the diaphragm 30 when the diaphragm valve 2 is fully opened, when the valve shaft 40 is turned approximately ninety degrees, the valve shaft 40 is moved by a distance equal to the clearance C between the valve seat 15 and the diaphragm 30. As a result, the diaphragm 30 is in contact with the valve seat 15, so that the gap between the inflow channel 13 and the outflow channel 14 is closed.

Advantageous Effects of Exemplary Embodiment

According to the first exemplary embodiment, only the joint 1 instead of a large diaphragm valve is disposed between the first connection pipe A and the second connection pipe B and the diaphragm valve 2 of which size is reduced is provided inside the joint 1. Accordingly, no eminent diaphragm valve is visible in the pipe system, so that the complicated impression can be eliminated and the appearance can be simplified.

In addition, since the stroke of the valve shaft of the diaphragm valve 2 for open/close operation may be small due to the structure of the diaphragm valve, the size of the joint body 10 in which the diaphragm valve 2 is provided can be reduced, so that the presence of the diaphragm valve can be made less eminent with the joint 1.

Further, since the joint 1 is directly supported by the first connection pipe A and the second connection pipe B via the cap nut 3, the bracket 60 and a component for attaching the bracket 60 can be omitted, so that the production cost can be reduced.

Further, the mating section of the rise portion 12 and the raised lid portion 21 and the mating section of the raised lid portion 21 and the valve shaft 40 of the joint 1 of the first exemplary embodiment are radially overlapped and the end of the valve shaft 40 is proximate to the diaphragm 30, the length of the valve shaft 40 can be considerably reduced, thereby allowing significant size reduction of the joint 1.

Further, since the cylindrical nut and the lock nut that are conventionally requisite are not necessary, the production cost can be further reduced.

Since the diaphragm valve 2 provided in the joint 1 can be closed only by turning the valve shaft 40 by ninety degrees, the turning operation of the valve shaft 40 can be extremely rapidly and easily conducted.

Since the arrow 55 is provided on the upper side wall 53 of the handle 50, the open/close condition can be visually checked according to the direction of the arrow 55. Accordingly, it is not necessary for an operator to recognize that the valve is closed according to a feel of the operator's hand, a damage and breakage of the valve seat 15 and the valve shaft 40 can be reduced.

Since the head 46 of the valve shaft 40 is provided in a form of a shaft portion of a rectangular cross section and the engagement hole 54 of the handle 50 is engageably and disengageably provided to the head 46, the handle 50 can be engaged with and disengaged from the head 46 of the valve shaft 40. After the handle 50 is attached, the valve shaft 40 can be manually turned without employing a tool and the like.

Further, since the bracket 60 for fixing the joint body 10 to a support plate (not shown) is detachably provided to the joint body 10, by fixing the joint body 10 to the support plate via the bracket 60 as necessary, the vibration and the like of the joint body 10 caused in accordance with circulation of fluid can be restrained.

Second Exemplary Embodiment

A second exemplary embodiment of the invention will be described below with reference to FIGS. 6 and 7.

Figure 6:
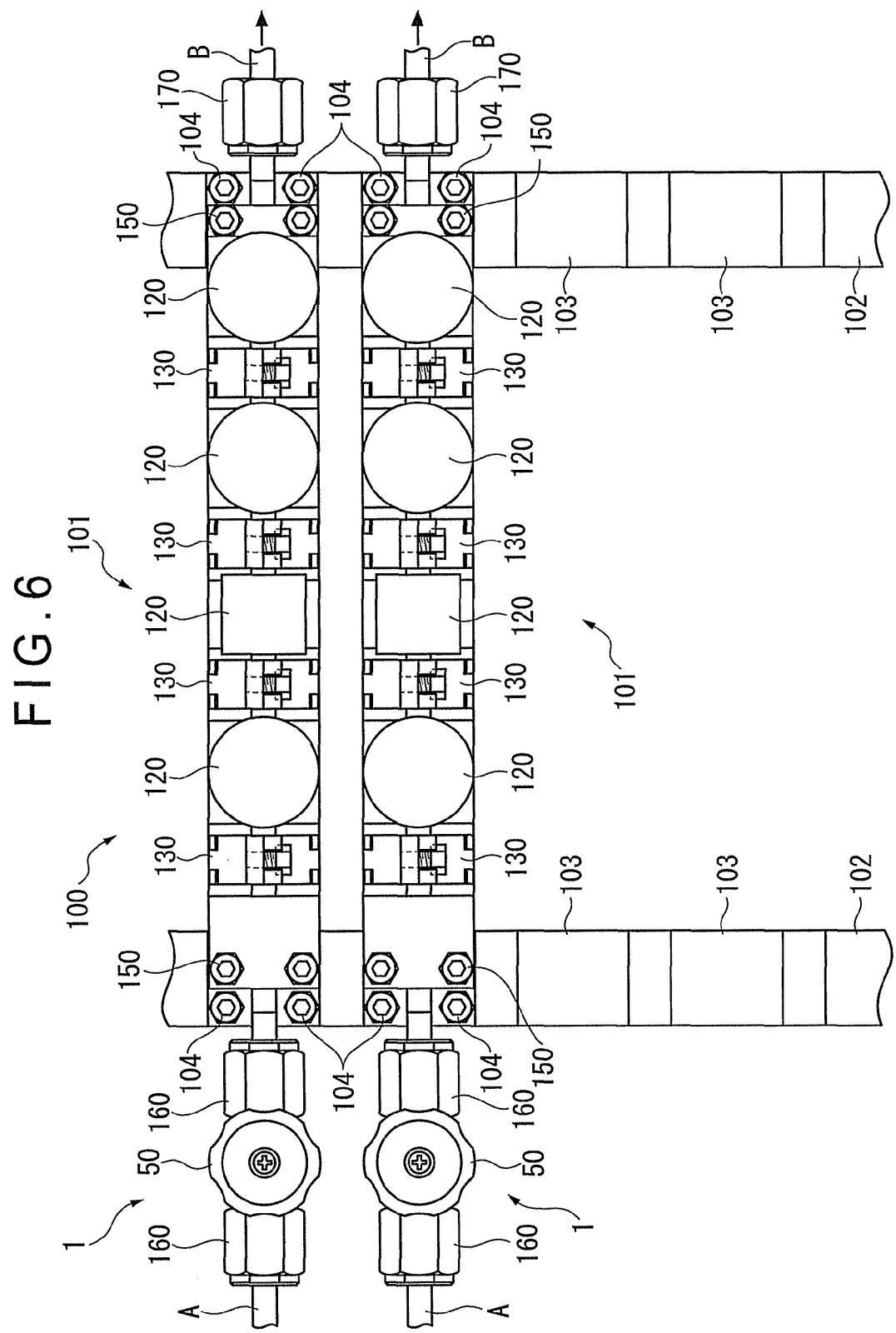
FIG. 6 is a plan view showing a gas component module integrated device according to a second exemplary embodiment of the invention.
Figure 7:
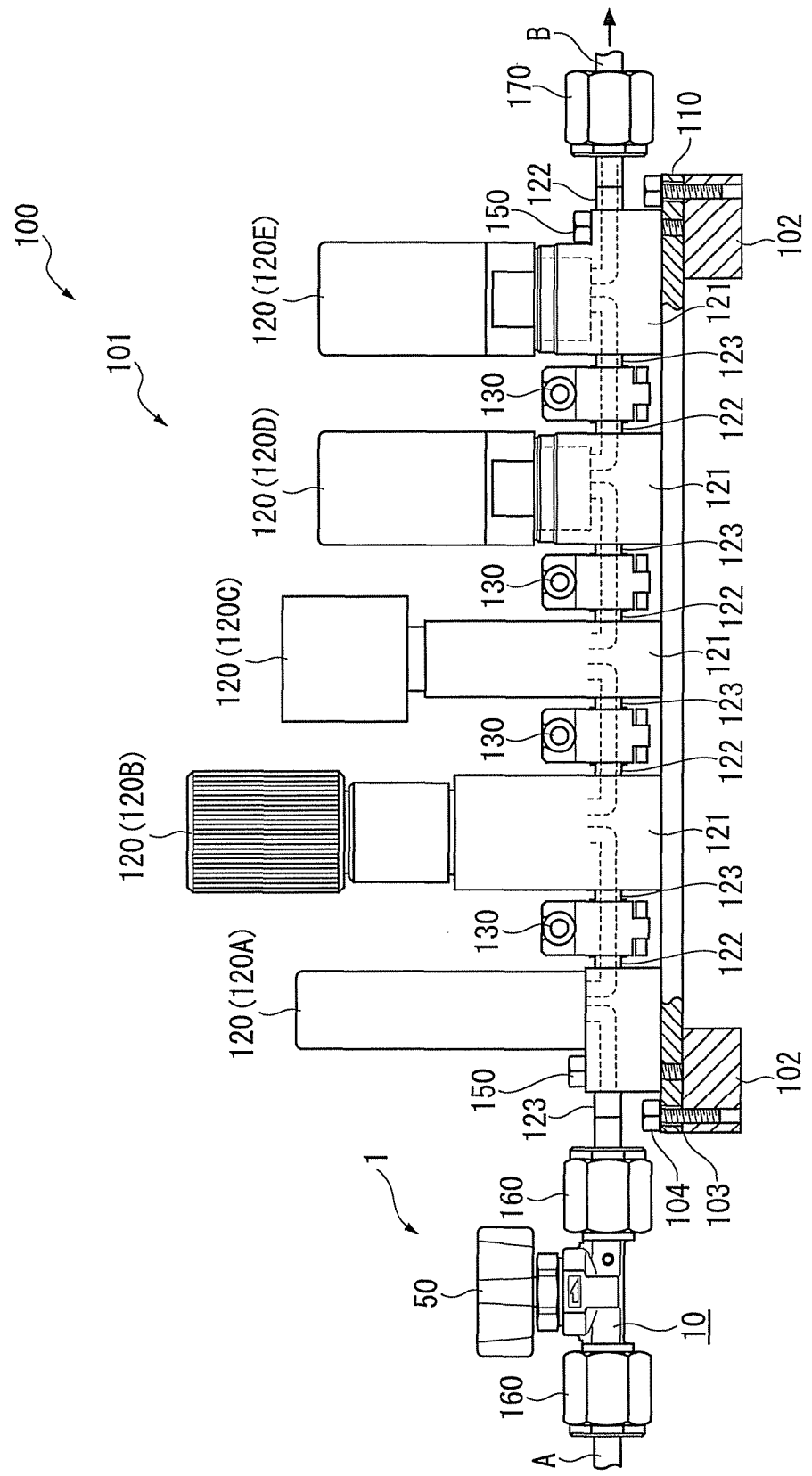
FIG. 7 is a front elevational view showing the second exemplary embodiment.

FIGS. 6 and 7 show an example according to the second exemplary embodiment of the invention in which the joint 1 described in the first exemplary embodiment is attached to an integrated apparatus 100 of a gas component module 101.

As shown in FIG. 6, the integrated apparatus 100 according to the second exemplary embodiment is an apparatus for supplying a plurality of reactive gases to a semiconductor manufacture apparatus and the like. The integrated apparatus 100 includes: a plurality of gas component modules 101; support rails 102 that are disposed orthogonally to the plurality of gas component modules 101, the support rails 102 supporting at least both ends of each of the gas component modules 101 juxtaposed in parallel at a predetermined interval; and bolts 104 (fixing unit) for fixing the gas component modules 101 onto the support rails 102.

Incidentally, accommodation grooves 103 for receiving the gas component modules 101 are provided at a predetermined interval on an upper face of each of the support rails 102. The gas component modules 101 are fixed by the bolts 104 with the ends of the gas component modules 101 being located in the accommodation grooves 103.

As also shown in FIG. 7, each of the gas component modules 101 includes: a plate 110 in a shape of a band of a predetermined width; a plurality of fluid control devices 120 disposed in a line on the plate 110 for controlling the reactive gas; pipe joints 130 for connecting the adjacently arranged fluid control devices 120; and fixing units 150 that fix two of the fluid control devices 120 (i.e. filter 120A disposed at a first end and an air valve 120E disposed at a second end) connected by the pipe joints 130 to the plate 110.

The first connection pipe A from a fluid source and a connection pipe 123 of the fluid control device 120 disposed at the first end (the filter 120A) are connected by a cap nut 160 (connector) and the joint 1 provided therein with the diaphragm valve 2 described in the first exemplary embodiment. A connection pipe 122 of the fluid control device 120 (the air valve 120E) located at the second end and the second connection pipe B to a semiconductor production apparatus are connected via a cap nut 170.

The fluid control devices 120 in the second exemplary embodiment include the filter 120A, a pressure regulator 120B, a pressure gauge 120C, an air valve 120D and the air valve 120E, though not exhaustive.

Each of the fluid control devices 120 includes: a control device body 121 provided therein with functional components of the control device (e.g. a valve mechanism and a filter mechanism); and connection pipes 122 and 123 protruded from the control device body 121 in a front and rear directions of each of the fluid control devices 120 (right and left directions in FIGS. 6 and 7).

The bottom face of the control device body 121 is configured to be parallel to the upper face of the plate 110 so as to be in close contact with the upper face of the plate 110. Specifically, the bottom face of the control device body 121 is configured to be parallel to the upper face of the plate 110 so that the bottom face of the control device body 121 is in close contact with the upper face of the plate 110.

The connection pipes 122 and 123 extending from adjacently disposed ones of the fluid control devices 120 are mutually faced. Thus, the connection pipes 122 and 123 are linearly arranged along the arrangement direction of the fluid control device 120.

Mutually facing flanges (not shown) are provided at ends of the mutually facing connection pipes 122 and 123 (i.e. an end of the connection pipe 122 protruding in a front direction in the arrangement direction (right direction in FIGS. 6 and 7) and an end of the connection pipe 123 protruding in a rear direction in the arrangement direction (left direction in FIGS. 6 and 7)). The flanges are joined by the pipe joints 130.

Though the details of the pipe joints 130 are not illustrated, the pipe joint disclosed in JP-A-2007-147011 can be suitably used. Specifically, the flanges of the connection pipes to be connected have an inclination face tapered toward outside, so that the cross section of the closely facing flanges becomes a trapezoid.

The pipe joint is a component provided by connecting a plurality of segments into a ring shape, in which a groove provided to each of the segments is fitted to cover each of the flanges along the circumferential direction of the connection pipe. In the above, the cross section of the groove of the pipe joint is also trapezoidal.

Thus, when the gap between the segments are narrowed by tightening an appropriate fastening unit, the inner diameter of the ring shape defined by each of the grooves is reduced to cause an wedge effect between the groove and both of the flanges of trapezoidal cross section, the wedge effect pressing the flanges toward each other.

The diaphragm valve 2 (FIG. 4) provided in the joint 1 attached to an inlet side of the reactive gas of the above-described gas component module 101 has conventionally been provided as one of the fluid control devices 120 of the gas component module 101. Specifically, the diaphragm valve 2 (FIG. 4) is provided as a manually operative diaphragm valve provided in a line with the other fluid control devices 120 and is fixed to the plate 110 at the most upstream side.

In contrast, in the second exemplary embodiment, the pipe functional component such as the diaphragm valve 2 is provided as a part of the joint 1 at the further upstream side of the filter 120A. An end of the joint 1 is supported by the first connection pipe A via the cap nut 3 and the other end of the joint 1 is supported by the connection pipe 123 of the filter 120A. In other words, the joint 1 is not fixed to the plate 110.

Accordingly, the joint 1 provided therein with the diaphragm valve 2 is not a part of the fluid control devices 120 of the gas component module 101 but is a part of the pipe system. Thus, the size and weight reduction of the gas component module 101 can be enhanced.

It should be understood that the scope of the present invention is not limited to the above-described exemplary embodiments but includes modifications and improvements as long as the modifications and improvements are compatible with the invention.

Though the handle 50 in the first exemplary embodiment is a cap-shaped component having the circumferential wall 51 and the upper side wall 53, the handle 50 may be provided in a different shape.

Figure 8:
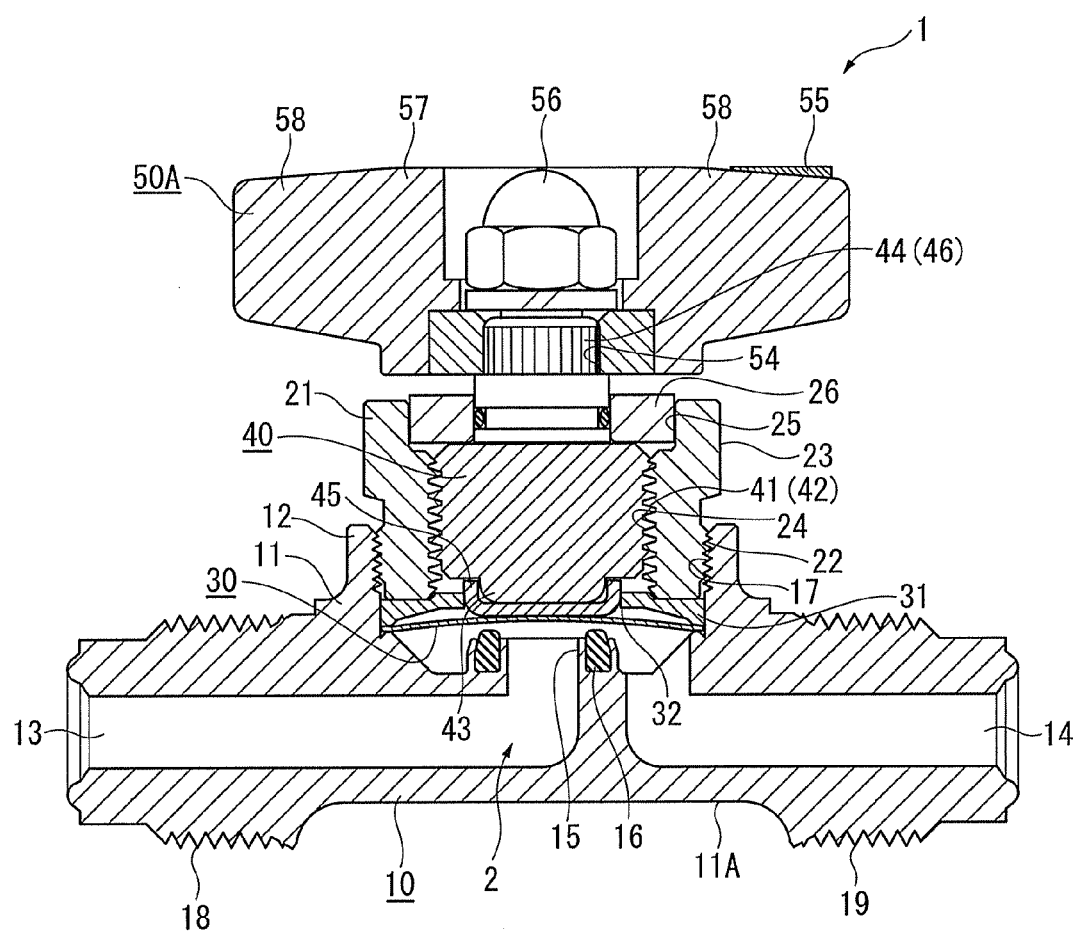
FIG. 8 is a cross sectional view showing a modification of the invention.
Figure 9:
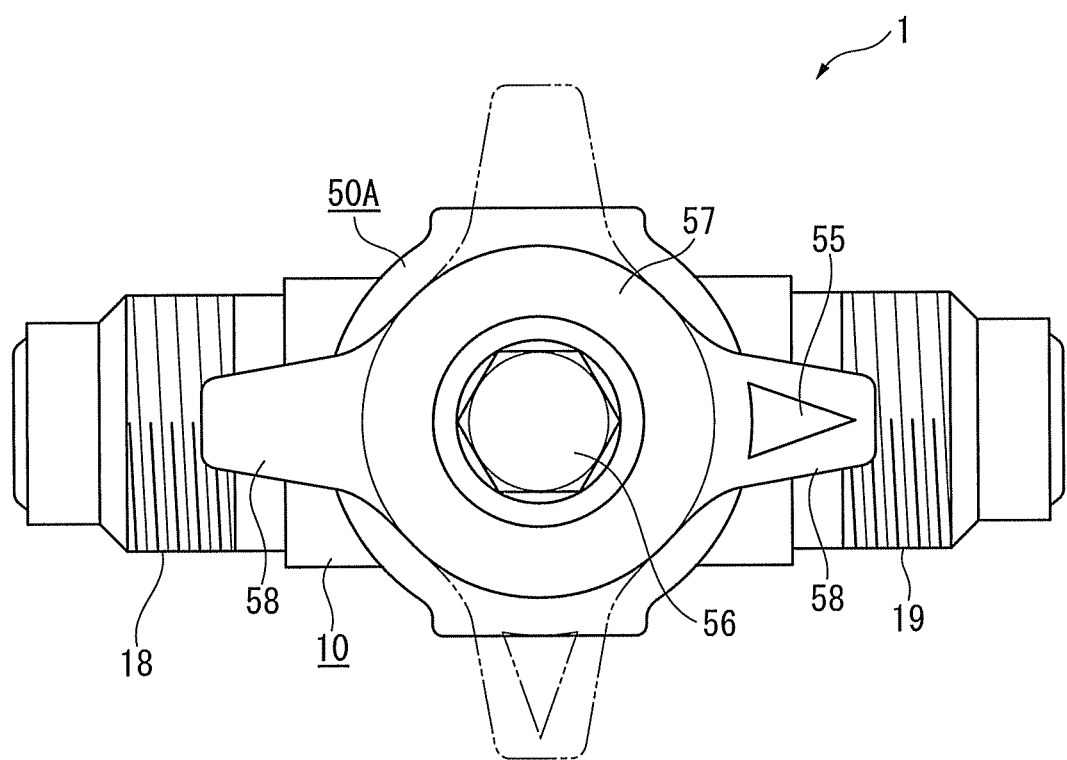
FIG. 9 is a plan view showing the above modification.
Figure 10:
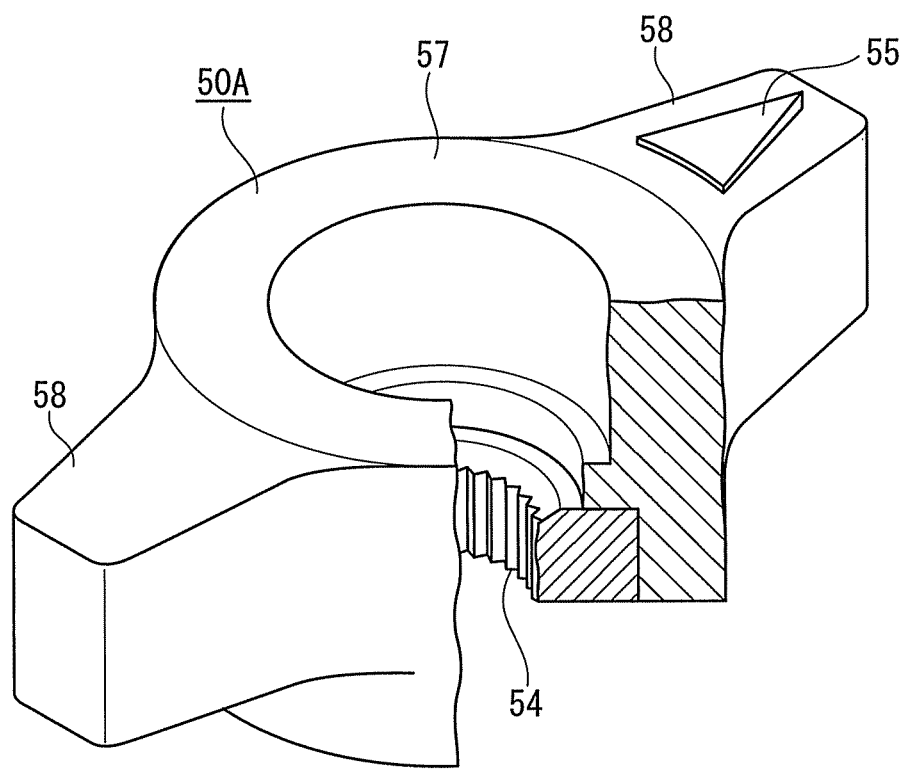
FIG. 10 is a partially sectioned perspective view showing a handle according to the above modification.

For instance, in the instances shown in FIGS. 8, 9 and 10, the handle 50A is not a cap-shaped component but includes a cylindrical portion 57 and two flanges 58 radially protruded from mutually opposing positions (180-degrees positions) of the outer circumference of the cylindrical portion 57. The arrow 55 is provided on an upper face of one of the two flanges 58. The head 46 of the valve shaft 40 is provided in a form of a triangular serration shaft portion. On the other hand, the engagement hole 54 of the handle 50A is provided in a form of a triangular serration hole to be engaged with the head 46 of the valve shaft 40.

The same advantages as those in the first exemplary embodiment can be obtained in the above arrangement.

The shapes of the head 46 of the valve shaft 40 and the engagement hole 54 of the handles 50 and 50A are not limited to the rectangular cross section and the triangular serration described in the first exemplary embodiment and the above modification, but may be a spline shaft and a spline hole to be engaged therewith.

Though the external thread 41 of the valve shaft 40 and the internal thread 24 of the raised lid portion 21 are provided as double thread screws, the external thread 41 and the internal thread 24 may be provided as a multiple thread screw having three or more threads.

Further, as long as the diaphragm valve can be opened and closed by turning the handle 50 by ninety degrees and a predetermined flow amount of the reactive gas can be circulated, it is not necessary to provide the external thread 41 and the internal thread 24 by a multiple thread screw.

Though the joint 1 is provided therein with the diaphragm valve 2 in the first exemplary embodiment, the pipe functional component to be provided in the joint according to the invention is not limited to a diaphragm valve but may alternatively be one of various valves including a check valve, a branch valve, a relief valve, a ball valve and a bellows valve, or a filter.

Further, in the gas component module, a fluid control device other than the diaphragm valve (e.g. a filter and an air valve) may be provided in the joint of the invention as the pipe functional component.

In the second exemplary embodiment, the diaphragm valve disposed at an end of the gas component module 101 is provided inside the joint 1 as a pipe functional component so that the diaphragm valve is provided as a part of the pipe system instead of a part of the gas component module 101. However, according to the type of the pipe functional component to be provided inside the joint of the invention, the joint may be disposed between a pair of the fluid control devices in the gas component module. In this instance, both ends of the joint are supported by the connection pipe of the fluid control device and the joint constitutes a part of the gas component module.

Further, in the above instance, in order to connect both ends of the joint and the fluid control devices, a connector such as the pipe joint 130 used in the second exemplary embodiment is suitably used instead of the cap nut in terms of size reduction.

What is claimed is:

1. A joint that connects pipelines, a pipeline with a fluid control device, or a pair of fluid control devices, the joint comprising:

a body provided inside the joint, the body comprising:
a tubular joint body comprising a cylindrical raised portion rising outward between a first end and a second end of the joint body and including a first internal thread formed on an inner circumference of the cylindrical raised portion;
an inflow channel extending from the first end of the joint body toward the raised portion;
an outflow channel extending from the raised portion toward the second end of the joint body; and
a pair of connecting portions disposed on an outer circumference of the body at positions respectively corresponding to an end of the inflow channel and an end of the outflow channel, the connecting portions each comprising an external thread portion being configured to be screwed to a connector, the connecting portions being configured to be connected with the pipeline or the fluid control device via the connector; and a diaphragm valve disposed in the body and configured to control a fluid flowing from the inflow channel to the outflow channel, the diaphragm valve comprising:
a valve seat disposed between the inflow channel and the outflow channel and formed by raising a circumference of the inflow channel toward a center of the raised portion so as not to protrude outward beyond radially outer circumferences of the connecting portions;
a resin seal ring embedded in an upper end face of the valve seat with a part of the resin seal ring protruding from the upper end face of the valve seat;
a diaphragm configured to be placed into and out of contact with the valve seat to open and close a gap between the inflow channel and the outflow channel;
a valve shaft that is disposed on a side of the body opposite the valve seat with the diaphragm being interposed between the valve shaft and the valve seat, the valve shaft being configured to be axially moved to bring the diaphragm into and out of contact with the valve seat, the valve shaft comprising a first external thread formed on an outer circumference of the valve shaft; and
a raised lid portion provided between the raised portion and the valve shaft, the raised lid portion comprising a second external thread formed on an outer circumference of the raised lid portion and mated with the first internal thread to define a first threaded portion and a second internal thread formed on an inner circumference of the raised lid portion and mated with the first external thread to define a second threaded portion;

wherein:
the first and second threaded portions are coaxially provided and are radially overlapped with each other;
the second internal thread comprises a double thread screw having a lead approximately four times as large as a clearance between the valve seat and the diaphragm when the diaphragm valve is fully opened;
the first external thread comprises a double thread screw having a lead approximately four times as large as the clearance between the valve seat and diaphragm when the diaphragm valve is fully opened;
the diaphragm is a metal disc member and is disposed so that the center of the diaphragm is located directly above the valve seat; and
a radially outer surface of the body at a part corresponding to a section between the pair of connecting portions and radially opposite the valve shaft is recessed radially inward relative to a radially outer part of the pair of connecting portions.

* * * * *